UNITED STATES PATENT OFFICE.

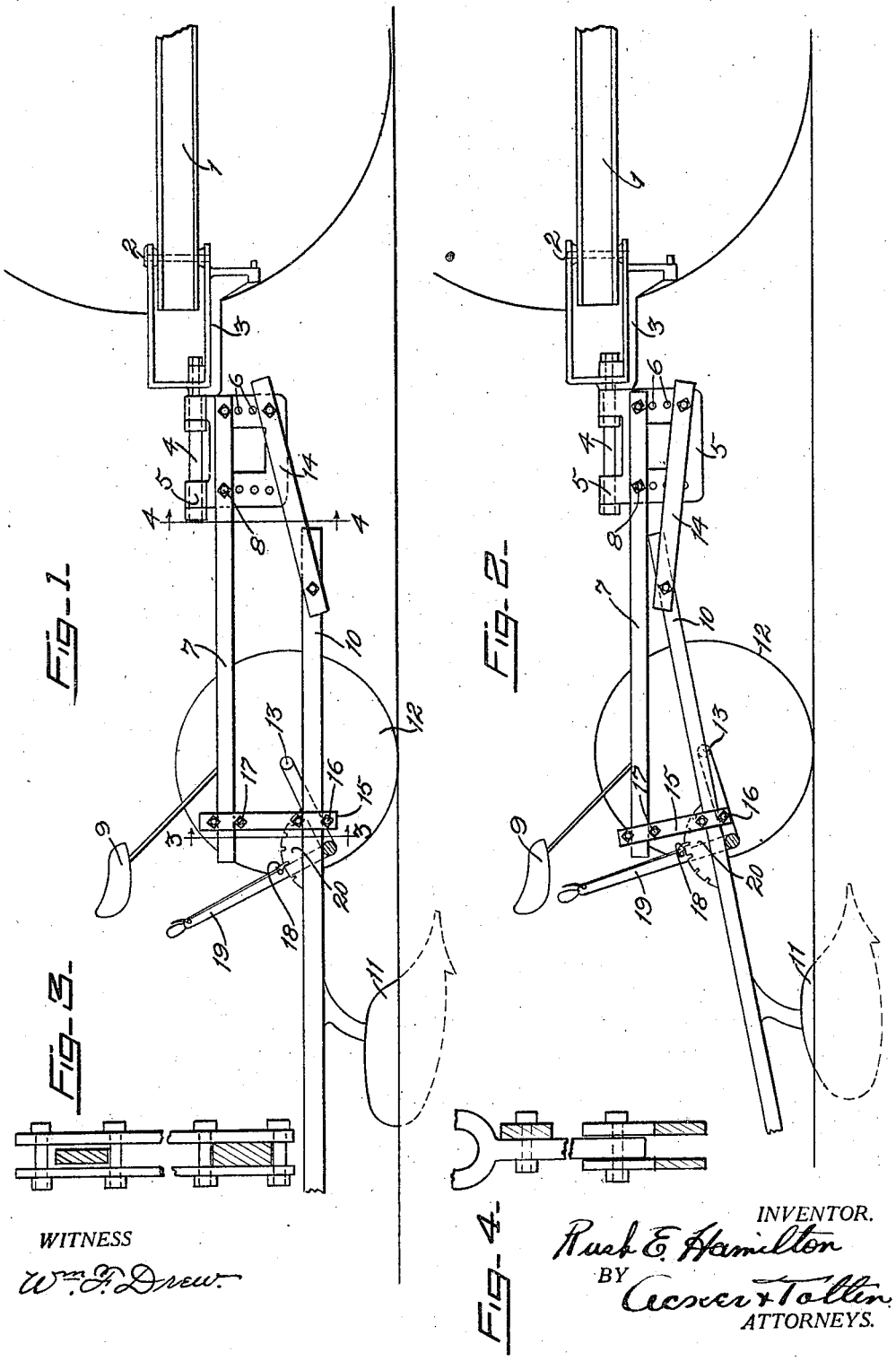

RUSH E. HAMILTON, OF GEYSERVILLE, CALIFORNIA, ASSIGNOR TO HAMILTON TRACTOR COMPANY, OF SAN FRANCISCO, CALIFORNIA, A CORPORATION OF CALIFORNIA.

WHEELED FARMING IMPLEMENT.

1,235,891. Specification of Letters Patent. Patented Aug. 7, 1917.

Application filed November 26, 1915. Serial No. 63,623.

*To all whom it may concern:*

Be it known that I, RUSH E. HAMILTON, a citizen of the United States, residing at Geyserville, in the county of Sonoma and State of California, have invented certain new and useful Improvements in Wheeled Farming Implements, of which the following is a specification.

The present invention relates to improvements in connections for wheeled plows and like implements whereby the same may be readily removed from and inserted into the ground while being drawn by a suitable tractor or other means. The invention has for its principal objects to provide a rigidly supported tractor bar whereby a direct pull from the source of power to the wheeled implement may be obtained, to provide a flexible connection for the forward portion of the plow beam, whereby the same may be raised or lowered upon the raising or lowering of the plow supporting wheels; to provide a connection between the tractor bar and the plow beam which will separate the tractor bar and plow beam and which will permit of a slight yielding movement of the beam relative to the connection.

With the above mentioned and other objects in view the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation of an embodiment of my invention as applied to a wheeled plow, disclosing the plow beam in a horizontal position with the plow in the soil.

Fig. 2 is a view in side elevation, but with the plow beam upwardly inclined and the plow about to be withdrawn from the soil on a forward movement of the plow.

Fig. 3 is a sectional view taken on line 3—3 of Fig. 1.

Fig. 4 is a sectional view taken on line 4—4 of Fig. 1.

Referring more particularly to the several views of the drawings wherein like characters of reference designate corresponding parts,—1 is the frame of a suitable tractor supported by a single pair of wheels 2'. Secured by a vertical pivot 2 to the frame 1 is a yoke 3 carrying a horizontally disposed shaft 4 which extends from the rear thereof. Pivotally mounted on the shaft 4 is a clevis 5 provided with apertures 6 therein.

A tractor bar 7 is rigidly secured at its forward end by bolts 8 to the clevis 5 and said bar carries an operator's seat 9 adjacent the rear thereof.

A plow beam 10, carrying one or more plows 11, is mounted beneath the tractor bar 7 and is supported by the wheels 12 carried by the U-shaped axle 13 pivoted at its center portion to the plow beam at a point approximately below the operator's seat 9. The plow beam is connected at its front end by the pivoted links 14 with the forward part of the clevis 5 through one of the holes 6 therein.

Braces 15 secured tightly to the plow beam 10 by the bolts 16 at either side thereof extend upwardly on either side of the tractor bar 7 and are secured thereto by the bolts 17 spaced from each edge thereof to permit of a slight rocking motion.

The axle 13 is maintained in its adjusted position by the sliding pawl 18 carried by the lever 19 secured to the axle and which coöperates with the ratchet 20 mounted on the beam 10.

I have provided a device particularly adapted for use in connection with a two-wheeled tractor and where the two wheels of the implement, together with the tractor wheels, provide the four supporting wheels of the train and prevent the tipping of the tractor, either forward or rearward.

The coupling between the tractor and implement permits of a lateral swing of the two members on a vertical axis, and also permits an oscillatory movement of the two members on a horizontal axis, and at the same time prevents any independent vertical movement of the ends of the frames of the respective members.

When the plow is in the soil, as in Fig. 1, the depth thereof is limited by the position of the wheels 12 relative to the beam 10. To remove the plow from the soil it is necessary for the operator to draw the lever 19 forwardly, which will force the wheels 12 downwardly onto the soil and which action will cause the front end of the plow beam 10 to be elevated, as in Fig. 2, which will upwardly incline the plow 11 and the forward movement of the tractor will cause the plow to be drawn from the soil. After the plow has been drawn from the soil, the operator is enabled to raise the same from the surface of the soil by a continued forward movement of the lever 19. The operator in the first movement raises the forward end of the beam and tilts the plow but does not manually lift the plow until the same is free of the soil.

When it is desired to again insert the plow in the soil, it is only necessary to raise the wheels until the plow strikes the soil, the links 14 permitting the beam to incline downwardly and the forward movement of the tractor will cause the plow to bury into the ground and the raising of the wheels regulates the depth thereof.

Having thus described my invention, what I claim as new and desire to protect by Letters Patent is:—

1. A wheeled farming implement comprising an implement beam, a soil engaging implement carried thereby, an axle pivotally connected to said beam and having offset wheel supporting spindles, supporting wheels carried by said spindles, a draft bar, a pivotal connection between the draft bar and said implement beam in advance of said implement for maintaining the intermediate portions of said bar and beam in spaced relation, and a pivotally mounted link connecting the front of said implement beam and said draft bar, whereby on the adjusting of said supporting wheels the said implement beam may be inclined for the purpose set forth.

2. A wheeled farming implement comprising a draft bar, a clevis secured to the front end thereof for attachment to a draft member, an implement beam carried below said draft bar, a soil engaging implement carried by said beam, a member for yieldably connecting the rear of said beam and said bar and maintaining the same in spaced relation, a link pivotally connecting the forward end of said beam and clevis and permitting free movement to the forward end of said beam vertically relative to said draft bar, a crank axle pivotally connected to said implement beam in advance of the implement, supporting wheels carried by the ends thereof, and means for operating the said axle to regulate the inclination of said implement beam.

3. A wheeled farming implement comprising a draft bar for securing at one end to a propelling means, an implement carrying beam beneath said draft bar and pivotally connected at a plurality of points therewith, said pivotal connection permitting of vertical angular movement of the implement beam relatively to said draft bar, and a single pair of simultaneously adjustable supporting wheels carried by said implement beam.

4. A wheeled farming implement comprising a draft bar for securing at one end to a propelling means, an implement carrying beam associated with said draft bar and pivotally connected thereto at a plurality of points, said pivotal connection permitting of vertical angular movement of said implement beam at its forward end toward said draft bar, and a single pair of simultaneously adjustable supporting wheels carried by said implement beam.

5. A wheeled farming implement comprising a draft bar for securing at one end to a propelling means, an implement carrying beam coöperating with said bar and positioned beneath the same in spaced relation thereto, a link pivotally connecting the forward end of said beam and bar, a brace rigidly carried at the rear of said beam and pivotally connected to the rear of said bar, a single pair of simultaneously adjustable supporting wheels carried by said beam, and an implement rigidly secured to said beam in rear of said brace connection.

In testimony whereof I have signed my name to this specification in the presence of two subscribing witnesses.

RUSH E. HAMILTON.

Witnesses:
HARRY A. TOTTEN,
D. B. RICHARDS.